(12) United States Patent
Lo

(10) Patent No.: US 7,001,032 B2
(45) Date of Patent: Feb. 21, 2006

(54) AUTOMOTIVE REAR VIEW MIRROR

(76) Inventor: Kam Chu Lo, 1021 Elgenia, West Covina, CA (US) 91790

( * ) Notice: Subject to any disclaimer, the term of this patent is extended or adjusted under 35 U.S.C. 154(b) by 38 days.

(21) Appl. No.: 10/722,983

(22) Filed: Nov. 28, 2003

(65) Prior Publication Data

US 2005/0117234 A1   Jun. 2, 2005

(51) Int. Cl.
*G02B 5/08*  (2006.01)
*B60R 1/04*  (2006.01)
*B60R 1/06*  (2006.01)
*B60R 1/08*  (2006.01)

(52) U.S. Cl. .................. 359/868; 359/838; 359/864; 359/866

(58) Field of Classification Search ............... 359/868, 359/866, 864, 838, 871
See application file for complete search history.

(56) References Cited

U.S. PATENT DOCUMENTS

| | | | | |
|---|---|---|---|---|
| 2,857,810 A | * | 10/1958 | Troendle | 359/868 |
| 3,764,201 A | * | 10/1973 | Haile | 359/864 |
| 4,258,979 A | * | 3/1981 | Mahin | 359/868 |
| 4,674,850 A | * | 6/1987 | Blom | 359/851 |
| 5,517,367 A | * | 5/1996 | Kim et al. | 359/864 |
| 5,557,467 A | * | 9/1996 | McColgan et al. | 359/605 |
| 2003/0169521 A1 | * | 9/2003 | Hoegh | 359/864 |

FOREIGN PATENT DOCUMENTS

| | | | | |
|---|---|---|---|---|
| JP | | S40-6148 Y | * | 2/1940 |
| JP | | 55-106835 A | * | 8/1980 |

* cited by examiner

*Primary Examiner*—John Juba, Jr.
(74) *Attorney, Agent, or Firm*—Raymond Y. Chan; David & Raymond

(57) ABSTRACT

An automotive rear view mirror includes a primary flat reflective surface that generates an undistorted image, and three secondary reflective surfaces that are curved so as to increase the field of view laterally and also vertically. The curved reflective surfaces include a relatively large trapezoidal surface curved in the horizontal plane for increasing the field of view in the horizontal direction, and two smaller triangular curved reflective surfaces contiguous with the upper and lower boundaries of the trapezoidal surface for increasing the field of view in the vertical direction.

7 Claims, 2 Drawing Sheets

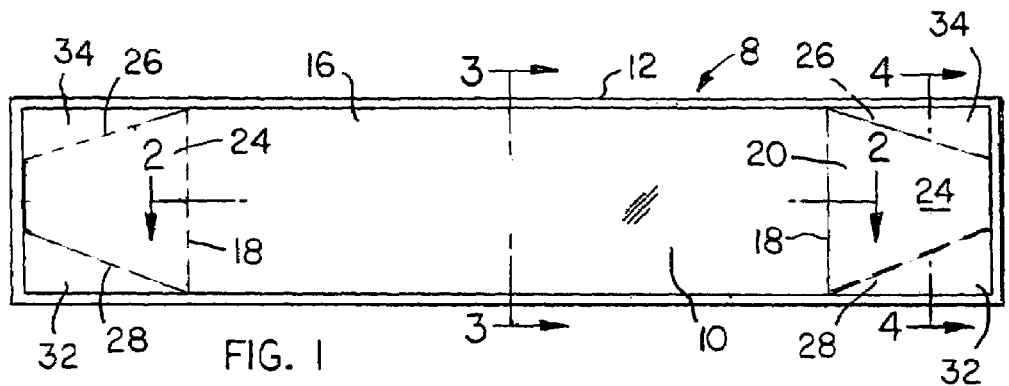
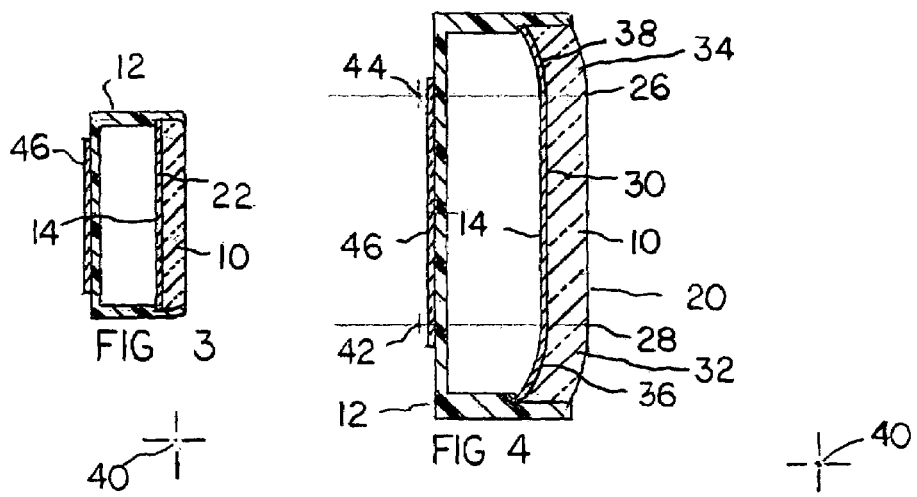
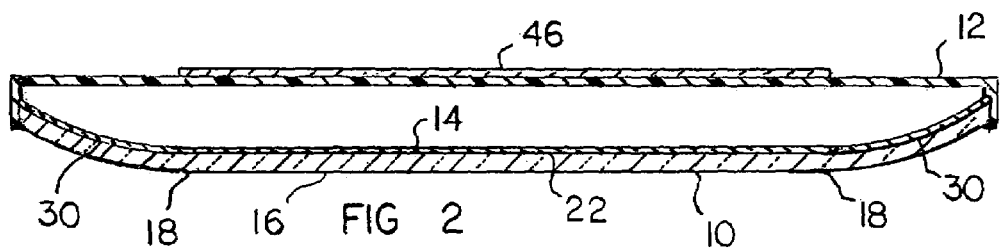

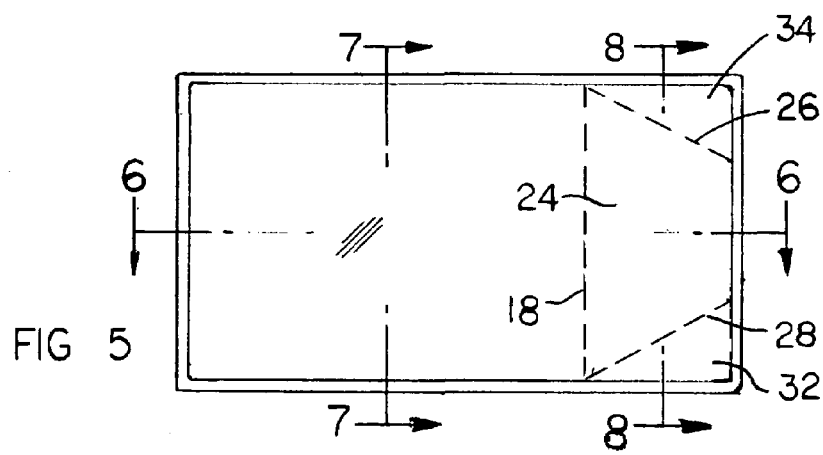
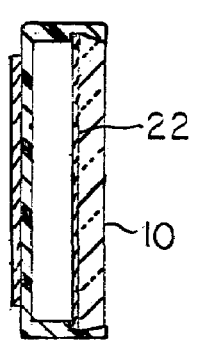
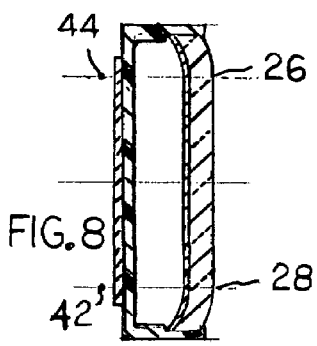
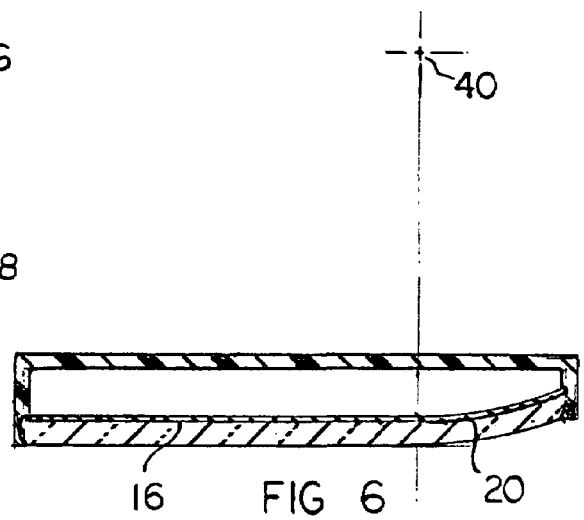
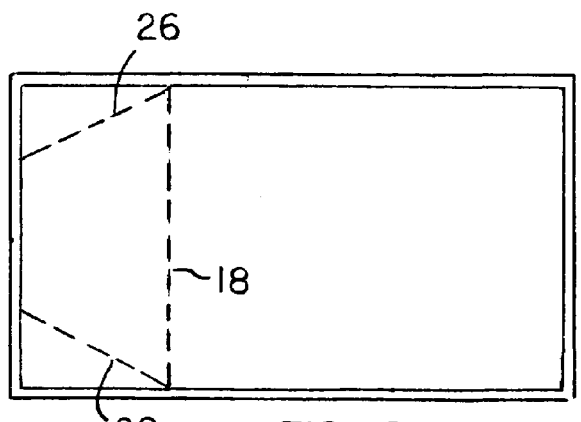

AUTOMOTIVE REAR VIEW MIRROR

FIELD OF THE INVENTION

This invention relates to an automotive rear view mirror, and particularly to a rear view mirror having curved reflective surfaces for minimizing blind spots behind the vehicle on which the mirror is installed.

BACKGROUND OF THE INVENTION

Automotive vehicles are commonly equipped with rear view mirrors for enabling the driver to effectively view objects directly behind the vehicle or behind areas alongside the vehicle. Often the vehicle is equipped with an interior rear view mirror located behind the front windshield, and two exterior rear view mirrors mounted on the front doors of the vehicle.

Conventional flat surface rear view mirrors are not completely satisfactory, in that flat surface mirrors cannot completely cover the areas that need to be covered, especially blind spots behind and alongside the rear corners of the vehicle.

To minimize the undesired blind spots it has been proposed to incorporate curved convex reflective surfaces in rear view mirrors. Such convex reflective surfaces minimize blind spots by increasing the mirror's viewing angle. Convex mirror surfaces that are convex in two orthogonal planes are sometimes termed "fisheye" mirror surfaces.

One problem with fisheye mirrors is distortion of the image generated by the mirror surface. Also, the image can be deceptively smaller than images generated by flat-surfaced mirror surfaces. U.S. Pat. No. 5,517,367, issued to R. H. Kim on May 14, 1996, shows a rear view mirror having convex "fisheye" mirror surfaces.

SUMMARY OF THE INVENTION

The present invention relates to a rear view mirror having add-on mirror sections that have minimal multi-plane (fisheye) curvatures, whereby the enhanced image produced by the add-on mirror section has minimal distortion and size reduction.

In one particular form of the invention the add-on mirror section includes a relatively large trapezoidal reflective surface curved only in the horizontal plane, and two smaller triangular reflective surfaces contiguous to the trapezoidal surface for increasing the field of view in the vertical direction. The relatively large trapezoidal reflective surface provides an image that is undistorted in the vertical direction.

Further features of the invention will be apparent from the attached drawings and description of an illustrative embodiment of the invention.

BRIEF DESCRIPTION OF THE DRAWINGS

FIG. 1 is an elevational view of an automotive rear view mirror constructed according to the invention.

FIG. 2 is a sectional view taken on line 2—2 in FIG. 1.

FIG. 3 is a sectional view taken on line 3—3 in FIG. 1.

FIG. 4 is an enlarged sectional view taken on line 4—4 in FIG. 1

FIG. 5 is an elevational view of a second embodiment of the invention.

FIG. 6 is a sectional view taken on line 6—6 in FIG. 5.

FIG. 7 is a sectional view taken on line 7—7 in FIG. 5.

FIG. 8 is a sectional view taken on line 8—8 in FIG. 5.

FIG. 9 is an elevational view of a third embodiment of the invention.

DESCRIPTION OF A PREFERRED EMBODIMENT OF THE INVENTION

FIG. 1 is an eleavtional view of an automotive rear view mirror constructed according to the invention. The mirror shown in FIG. 1 is designed for positionment within a vehicle behind the front windshield on or near the longitudinal centerline of the vehicle. The mirror is often termed an interior rear view mirror because of its location within the vehicle.

FIG. 5 is an elevational view of a second automotive rear view mirror embodying the invention. The FIG. 5 mirror is designed for positionment outside a vehicle on the passenger side of the vehicle; the mirror is attached to a front edge area of the vehicle door where it can be viewed by the driver of the vehicle. The FIG. 5 mirror is often termed an exterior rear view mirror.

FIG. 9 shows an exterior rear view mirror embodying the invention, and designed for positionment outside the vehicle on a front edge of the driver side door. FIGS. 1, 5 and 9 are taken in directions looking toward the mirror surface.

Referring particularly to FIG. 1 through 4, there is shown a rear view mirror 8 comprising a transparent glass (or plastic) panel 10 fixedly mounted within an opaque case (or housing) 12. A reflective (silver) coating 14 is formed on one surface of transparent panel 10, whereby images are projected from the reflective coating outwardly through the transparent panel.

Panel 10 is comprised of flat and curved sections that are combined to generate an image having a relatively wide viewing angle with minimal distortion and size reduction. The panel 10 includes a flat central section 16 extending between two imaginary limit lines 18, 18, and three secondary curved sections at each end of the flat central section.

Central section 16 of the mirror forms a primary reflective surface 22 that is flat in the vertical plane (as shown in FIG. 3), and also flat in the horizontal plane (as shown in FIG. 2). Consequently the primary reflective surface generates an image that is undistorted in both the vertical plane and the horizontal plane.

The three secondary curved sections at each end of the mirror include a first relatively large trapezoidal section 24, defined in part by upper imaginary boundary line 26 and lower imaginary boundary line 28. Curved section 20 forms a curved reflective surface 30 that has a convex curvature in the horizontal plane (as shown in FIG. 2) while being flat in the vertical plane (as shown in FIG. 4). The image generated by trapezoidal reflective surface 30 is undistorted in the vertical plane. There is some distortion in the horizontal plane.

The three curved sections of the transparent panel include a second relatively small triangular section 32 (the area below boundary line 28) and a third relatively small triangular section 34 (the area above boundary line 26). As shown in FIG. 4, each triangular section 32 or 34 has a convex curvature; each associated reflective surface 36 or 38 has a similar curvature.

Convexly curved surface 36 widens the image generated by the trapezoidal reflective surface 30 in the downward direction. Convexly curved surface 38 widens the image generated by trapezoidal surface 30 in the upward direction. Consequently, the image generated by the combination of reflection surfaces 30, 36 and 38 has a larger field of view in the vertical plane, as compared to a condition in which the image was created by a single curved surface of the same vertical dimension. The increased field of view in the vertical plane is beneficial in that both taller and shorter objects can be completely imaged (e.g. motorcycles and large trucks).

The mirror system is preferably designed so that the image generated by primary reflective surface 22 and the three secondary curved surfaces 30,36 and 38 is a continuous realistic picture, without gaps or image overlapment.

A realistic image is achieved partly by making curved reflective surface 30 contiguous to flat reflective surface 22, and by making each curved reflective surface 36 or 38 contiguous with curved surface 30, as shown in FIG. 1. In this connection, it will be realized that boundary lines 18, 26 and 28 are imaginary lines used merely to indicated changes in surface curvature.

A realistic image is achieved partly by making curved reflective surface 30 contiguous to flat reflective surface 22, and by making each curved reflective surface 36 or 38 contiguous with curved surface 30 as shown in FIG. 1. In connection, it will be realized that boundary lines 18, 26 and 28 are imaginary lines used merely to indicate changes in surface curvature.

A realistic image is also realized, in part, by making the various reflective surfaces smooth uninterrupted conditions of each other. Curved surface 30 is a smooth continuation of flat reflective surface 22. Each curved reflective surface 36 or 38 is a smooth continuation of curved surface 22.

To achieve the desired smooth surface continuation between surfaces 22 and 30 the curvature of reflective surface 30 can be formed by a radius taken around a center axis 40 that is located in a plane containing boundary line 18 and normal to reflective surface 22, as shown in FIG. 2. With such an arrangement, flat reflective surface 22 is tangent to curved reflective surface 30, so that surface 30 forms a smooth continuation of surface 22, without abrupt changes in surface contour.

Similarly, curved surface 36 has a radius of curvature around an axis line 42 that parallels boundary line 28, such that reflective surface 30 is tangent to curved surface 36. Likewise curved surface 38 has a radius of curvature around an axis line 44 that parallels boundary line 26, such that reflective surface 30 is tangent to curved surface 38.

The smooth tangent surface continuation between reflective surfaces 22, 30,36 and 38 contributes to an image that has minimal distortion while covering a large field of view in the vertical direction, particularly in areas optically scanned by triangular surfaces 36 and 38.

FIG. 1 shows a flat surfaced mirror having three curved reflective surfaces at each end of the mirror. The curved surfaces at the right end of the mirror have been described in some detail. The corresponding curved surfaces at the left end of the mirror can be similar to the described surfaces. However, the radius of each curved surface need not be exactly the same in each case. As shown in FIG. 2, the radius of curvature for reflective surface 30 of the left end of the mirror is somewhat greater than the radius of curvature for surface 30 at the right end of the mirror, in accordance with the fact that the blind spot on the driver side is usually less of a problem than on the passenger side.

The mirror system depicted in FIGS. 1 through 4 can be mounted on a vehicle windshield, using conventional bracketry. However, it is also possible to attach the mirror system to an existing conventional rear view mirror already in place on the vehicle. In FIGS. 2, 3 and 4, there is shown a self-adhesive sheet 46 carried on the exterior surface of mirror case 12 for attaching the mirror system to a pre-existing conventional mirror. Sheet 46 has a contact adhesive on its exterior surface for attachment of the mirror system to the glass area of a conventional mirror.

FIGS. 5 through 8 show an exterior side view mirror of the present invention adapted for positionment on the passenger door of the vehicle. The flat surface reflective area 16 is located proximate to the door, while the curved reflective areas 20, are located outboard away from the door.

FIG. 9 shows an exterior side view mirror of the present invention adapted for positionment on the driver side door.

The invention can be practiced, using an interior rear view mirror (as shown in FIGS. 1 through 4), or an exterior rear view mirror (as shown in FIGS. 5 through 9).

What is claimed:

1. An automobile rear view mirror comprising: a mirror structure having a primary reflective surface and three secondary reflective surfaces; said mirror structure having a normal positionment wherein the primary reflective surface has a vertical orientation;

said primary reflective surface being flat in both the vertical plane and the horizontal plane, whereby the image generated by said primary reflective surface is undistorted;

said secondary reflective surfaces comprising a first relatively large reflective surface having a trapezoidal shape, and second and third relatively small reflective surfaces having triangular shapes;

said first, trapezoidal reflective surface being contiguous to the primary reflective surface; said second and third, triangular reflective surfaces being contiguous to said first, trapezoidal reflective surface;

said first, trapezoidal reflective surface having a curved convex curvature in the horizontal plane and a flat configuration in the vertical planes, whereby the image generated by said trapezoidal reflective surface is undistorted in the vertical plane;

said second, triangular reflective surface extending downwardly from said trapezoidal reflective surface; said third, triangular reflective surface extending upwardly from said trapezoidal reflective surface; said second and third reflective surfaces having curved convex curvatures in the vertical plane.

2. The rear view mirror of claim 1, wherein said trapezoidal reflective surface forms a smooth uninterrupted continuation of the primary reflective surface.

3. The rear view mirror of claim 2, wherein said primary reflective surface is tangent to said trapezoidal reflective surface.

4. The rear view mirror of claim 1, wherein said second and third triangular surfaces form smooth uninterrupted continuations of said trapezoidal reflective surface.

5. The rear view mirror of claim 4, wherein said trapezoidal reflective surface is tangent to said second and third convex triangular reflective surfaces.

6. The rear view mirror of claim 1, wherein said mirror structure is positionable within a vehicle behind the front windshield of the vehicle.

7. The rear view mirror of claim 1, wherein said mirror structure is positionable outside a vehicle on a front door of the vehicle.

* * * * *